Nov. 24, 1964 R. W. WARREN 3,158,166

NEGATIVE FEEDBACK OSCILLATOR

Filed Aug. 7, 1962 2 Sheets-Sheet 1

INVENTOR

RAYMOND W. WARREN

BY S. J. Rotondi, A. T. Dupont and Robert C. Lucke

United States Patent Office 3,158,166

Patented Nov. 24, 1964

3,158,166
NEGATIVE FEEDBACK OSCILLATOR

Raymond W. Warren, McLean, Va., assignor to the United States of America as represented by the Secretary of the Army Filed Aug. 7, 1962, Ser. No. 215,472
2 Claims. (Cl. 137—81.5)
(Granted under Title 35, U.S. Code (1952), sec. 266)

The invention described herein may be manufactured and used by or for the Government of the United States of America for governmental purposes without the payment to me of any royalty thereon.

This invention relates to fluid oscillators and, more particularly, to a negative feedback fluid oscillator.

Electronic systems and components are capable of performing such functions as signal generation and frequency control and other time base functions. However, it is also desirable that systems other than electronic perform the same or analogous functions without requiring a source of electrical energy or delicate electronic components. While known mechanical systems will perform functions somewhat analogous to functions performed by electronic systems, the former systems require a large number of moving parts. Failure in any part usually results in improper operation of the system. Also, the electronic systems and the mechanical systems utilize the scalar quantities of equi-potential and pressure.

The present invention relates generally to fluid oscillator systems having no moving solid parts in which amplification is a function of the magnitude of deflection of a main fluid jet by a transverse fluid pressure distribution, and in which oscillation is a function of the transverse fluid pressure fed back from the main fluid jet. More particularly, it relates to a fluid oscillator utilizing the effects of interaction between the fluid streams and the side walls of the interaction region to control the pressure distribution within the main fluid jet so as to govern the main fluid jet flow path; and to control local pressure distribution of the interaction region fluids which are not within the main fluid jet so as to govern the main fluid jet flow path; and utilizing the vector properties of fluid flow. The side walls serve a further function as a resisting solid boundary to restrict motion and flow of fluid particles within the interaction region. In consequence of the interaction between the interaction region side walls and the fluid in the main stream and the ambient fluid, and in consequence of the vector properties of fluid flow, the oscillators of the present invention are capable of performing oscillation and switching functions somewhat analogous to those now conventionally performed only by electronic circuits or, to a more limited extent, by fluid systems which have moving parts.

Broadly, therefore, it is an object of this invention to provide an oscillator fluid-operated system which performs some functions which are analogous to functions performed by existing electronic systems.

More specifically, it is an object of this invention to utilize the flow of a stream of fluid under pressure so that the fluid acts in a manner somewhat similar to the manner in which electrons act in electronic systems.

It is an object of this invention to provide a fluid system capable of producing results similar to those achieved by control electrons in electronic systems.

It is another object of this invention to utilize the principle of "boundary layer control" to effect a continuously variable amplitude of switching action of a fluid power stream from one aperture to another.

Still another object is to utilize the principle of "boundary layer control" to effect a definite multiple switching action of the fluid stream from one receiver to another.

Still another object of this invention is to provide a fluid-operated system which utilizes the vector properties of fluid stream flow.

It is a further object of this invention to provide an oscillator fluid-operated system, in accordance with the above objects, which requires no moving parts other than the fluid.

Another object of this invention is to utilize a portion of the main fluid stream to be the means of deflecting the main stream.

In fluid oscillator systems of the type with which the present invention is concerned, a power jet of fluid, which is well defined in space, is deflected by means of a pressure differential established approximately transverse to the normal direction of movement of the power jet. The differential in pressure established across the power jet may be employed to deflect the jet to one of various positions at which load devices may be situated. These may convert a portion of the energy of the fluid stream to useful work. Alternately, the energy, pressure or mass flow of the deflected stream may be employed as an input signal or a control signal to a fluid amplifier system to perform switching functions. Amplification is achieved by the fluid amplifier as a result of the fact that relatively small control fluid flow is required to deflect a high energy fluid stream so as to produce a relatively large variation in energy, pressure or mass flow, delivered to an output location.

A typical oscillator, chosen for purposes of ease of explanation only, may comprise a main fluid nozzle extending through an end wall of an interaction region defined by a sandwich type consisting of an upper plate and a lower plate (which serve to restrict fluid flow to an approximately two-dimensional flow pattern between the two plates) and a central plate. The central plate is machined or molded to provide an end wall, two sidewalls (hereinafter referred to as the left and right sidewalls), and one or more dividers disposed at a predetermined distance from the end wall. The leading edges or surfaces of the dividers are disposed relative to the main fluid nozzle centerline so as to define separate areas in a target plane. The sidewalls of the dividers in conjunction with the interaction region sidewalls establish the receiving apertures, or receivers, which are entrances to the oscillator output channels. Completing the description of the apparatus, left and right control orifices extend through the left and right sidewalls respectively, and terminate in control nozzles which have their center lines passing orthogonally through the centerline of the main fluid nozzle. Left and right feedback channels connect the left and right oscillator output channels, respectively, to the left and right control nozzles. In the complete unit, the region bounded by top and bottom plates, sidewalls, the end wall, receiving apertures, dividers, control orifices and a main fluid nozzle, is termed an "interaction region or interaction chamber region." The unit described above is capable of operating as one of several subtypes of fluid oscillator units depending upon the specific arrangement of the unit.

Two broad classes of pure fluid amplifiers are—I. Stream Interaction or Momentum Exchange and II. Boundary Layer Control.

In order to understand operation of this first broad class of fluid amplifiers, Class I, attention is called to the copending patent applications of B. M. Horton, Serial Nos. 848,878, now abandoned, and 51,896, now Patent No. 3,112,165, filed October 26, 1959 and September 19, 1960, respectively, portions of the discussions of which are reproduced herewith for the purposes of clarity of the present discussion only. Class I amplifiers include devices, in distinction to the devices of Class II, in which there are two or more streams which interact in such a way that one or more of these streams (control streams) deflects another stream (power stream) with little or no interaction between the side walls of the interaction region and the streams themselves. Power stream deflection in such a unit is continuously variable in accordance with control signal amplitude. Such a unit is referred to as a continuously variable amplifier or computer element. In an amplifier or computer element of this type, the detailed contours of the side walls of the interaction chamber are of secondary importance to the interacting forces between the streams themselves. Although the side walls of such units can be used to contain fluid in the interacting chamber, and thus make it possible to have the streams interact in a region at some desired ambient pressure, the side walls are so placed that they are somewhat remote from the high velocity portions of the interaction streams and the power stream does not approach or attach to the side walls. Under these conditions the power stream flow pattern within the interacting chamber depends primarily upon the size, speed and direction of the power stream and control streams and upon the density, viscosity, compressibility and other properties of the fluids in these streams.

Class II fluid amplifiers, computer elements and oscillators are of the broad class to which the present invention is related; that is, boundary layer control units. This second broad class of fluid amplifiers, computer elements and fluid oscillators comprises units in which the main power stream flow and the surrounding fluid interact in such a way with the interaction region side walls that the resulting flow patterns and pressure distributions within the interaction region are greatly affected by the details of the design of the chamber walls. In this broad class of units, the power stream may approach or may contact the interaction region side walls. The effect of the side wall configuration on the flow patterns and pressure distribution, which can be achieved with single or multiple streams, depends upon the relation between: the width of the interacting chamber near the power nozzle, the width of the power nozzle, the position of the center line of the power nozzle relative to the side walls (symmetrical or asymmetrical), the angles that the side walls make with respect to the center line of the power nozzle; the length of the side walls or their effective length as established by the spacing between the power nozzle exit and the flow dividers, side wall contour and slope distribution; and the density, viscosity, compressibility and uniformity of the fluids used in the interaction region. It also depends on the aspect ratio and, therefore to some extent, on the thickness of the amplifying or computing or oscillating element in the case of two-dimensional units. The interrelationship between the above parameters is quite complex and is described subsequently. Response time characteristics are a function of size of the units in the case of similar units.

Fluid devices of this second broad category which utilize boundary layer effects; that is, effects which depend upon details of side wall configuration and placement, can be further subdivided into three sub-types:

(*a*) Boundary layer units in which there is no "lock-on" effect.
(*b*) Boundary layer units in which "lock on" effects are appreciable.
(*c*) Boundary layer units in which "lock on" effects are dominant and which have memory.

(*a*) Boundary layer units in which there is no "lock-on" effect. Such a unit has a gain as a result of boundary layer effects. However, these effects do not dominate the control signal but instead combine with the control flows to provide a continuously variable output signal responsive to control signal amplitude. In these units the power stream remains diverted from its initial direction only if there is a continuing flow out of or into one or more of the control orifices.

(*b*) Boundary layer units in which "lock on" effects are appreciable. In these units, the boundary layer effects are sufficient to maintain the power stream in a particular deflected flow pattern through the action of the pressure distribution arising from asymmetrical boundary layer effects and require no additional streams, other than the power stream to maintain that flow pattern. Naturally in this type unit continuous application of a control signal can also be used to maintain a power stream flow pattern. Such flow patterns can be changed to a new stable flow pattern, however, either by supplying or removing fluid through one or more of the control orifices, or through a control signal introduced by altering the pressures at one or more of the output apertures, as for example by blocking of the output channel to which flow has been directed.

(*c*) Boundary layer control units which have "memory"; that is, wherein lock-on characteristics dominate control signals resulting from complete blockage of the output to which flow has been commanded.

In "memory" type boundary layer units, the flow pattern can be maintained through the action of the power stream alone without the use of any other stream or continuous application of a control signal. In these units, the flow pattern can be modified by supplying or removing fluid through one or more of the appropriate control orifices. However, certain parts of the power stream flow pattern, including "lock-on" to a given side wall, are maintained even though the pressure distribution in the output channel to which flow is being delivered is modified, even to the extent of completely blocking this output channel.

The power stream deflection phenomena in boundary layer units is the result of a transverse pressure gradient due to a difference in the effective pressures which exist between the power and the opposite interaction region side walls; hence, the term Boundary Layer Control. In order to explain this effect, assume initially that the fluid stream is issuing from the main nozzle and is directed toward the apex of a centrally located divider. The fluid issuing from the nozzle, in passing through the chamber, entrains some of the surrounding fluid in the adjacent interaction regions and removes this fluid therefrom. If the fluid stream is slightly closer to, for instance, the left side wall than the right side wall, it is more effective in removing the fluid in the interaction region between the stream and the left wall than it is in removing fluid between the stream and the right wall since the former region is smaller. Therefore, the pressure in the left interaction region between the left side wall and power stream is lower than the pressure in the right interaction region and a differential pressure is set up across the power jet tending to deflect it towards the left side wall. As the stream is deflected further toward the left side wall, it becomes even more efficient in entraining fluid from the left interaction region and the effective pressure in this region is further reduced. In those units which exhibit "lock-on" features or characteristics, this feedback-type action is self-reinforcing and results in the fluid power stream being deflected toward the left wall and predominantly entering the left receiving aperture and outlet channel. The stream attaches to and is then directly deflected by the left side wall as the power stream effectively intersects the left side wall at a predetermined distance downstream from the outlet of the main orifice; this location being normally referred to as the "attachment location." This phenomena is referred to as Boundary Layer Lock-on. The operation of this type of apparatus may be completely symmetrical in that if the stream had initially been slightly deflected toward the right side wall rather than the left side wall, boundary layer lock-on would have occurred against the right side wall.

Control of these units can be effected by controlled flow of fluid into the boundary layer region from control orifices at such a rate that the entrainment characteristics of the stream are satisfied and the pressure in the associated boundary layer region becomes equal to the pressure in the opposing boundary layer region located on the opposite side of the power stream. As a result, the stream detaches from the wall and moves toward the centerline of the power nozzle. The entrainment of the opposite side lowers the pressure and the stream is switched towards this "opposite" side of the unit.

Alternately, instead of having flow into the boundary layer region to control the unit, fluid may be withdrawn from this "opposite" control to effect a similar control by lowering the pressure on this "opposite" side of the stream instead of raising the pressure on the first side. The control flow may be at such a rate and volume as to deflect the power stream partially by momentum interchange so that a combination of the two effects may be employed. However, it is not essential, and in many cases is undesirable, that the control flow have a momentum component transverse to the power stream when the control fluid issues from its control orifice.

Only a small amount of energy is required in the control signal fluid flow to alter the power jet path so that some or all of the power jet becomes intercepted by the load device or output channel. For an intermittently applied control signal, the power gain of this system can be considered equal to the ratio of the "change of power delivered by the oscillator to its output channel or load" to the "instantaneous change of control signal power" required to effect this associated "change of power" delivered to the output channel or load. Similarly, the pressure gain can be considered equal to the ratio of the "change of output pressure" to the "instantaneous change of control signal pressure" required to cause the change, or, the ratio of the "change of output channel mass flow rate" to the associate "instantaneous change of control signal mass flow rate" required defines the mass flow rate gain.

Thus it is clear that, in addition to the feedback channels of the oscillator, the boundary layer effects provide a feedback action and have an important bearing on its gain, sensitivity to feedback control signals, sensitivity to control signals introduced by back loading (which effects pressure at the receiving apertures or output channels, response time and, frequency response.

In the above discussion a two dimensional configuration has been described for purposes of clarity. However, the invention and description relative thereto are also inclusive of configurations which are three-dimensional in nature, as for example, axially symmetric units which result from rotation of a plan view about an axis coincident with the power nozzle centerline, rotation of the right or left half of a plan view about an axis parallel to but displaced from the aforementioned centerline, or rotation of a plan view about an axis normal to but in the plane of the plan view so as to provide toroidal geometry.

In addition, while the particular examples describe symmetrical units, it is apparent that asymmetric units of the types described and of combinations of the types described from part of this invention. For example, a two dimensional unit may comprise a right half which if of type (*c*) and a left half in which the left side wall length is less than the distance between power nozzle exit and divider leading edge. For such a unit the left half of the unit functions as a type (*b*) boundary layer control unit while the right half functions as a type (*c*) boundary layer unit.

When reference is made to a "pure fluid" oscillator or amplifier, the use of pure fluids is not required. Pure fluid oscillators or amplifiers are those devices in which oscillation or amplification is achieved purely through use of fluid without the necessity of moving solid parts. The fluid employed may be pure, or a mixture of fluids, or contaminated fluids, or fluids with entrained or suspended solids; wherein "fluid" refers to either or both compressible or incompressible fluids.

Fluid amplifiers constructed by the principles discussed in this application are disclosed in the copending application Serial No. 58,188, filed October 19, 1960 for Fluid Amplifier Employing Boundary Layer Effect by Raymond W. Warren, the applicant of this invention, and Romald E. Bowles. Such application is a continuation-in-part of the application Serial No. 855,478, now abandoned, filed November 25, 1959, for Multistable Fluid Operated Systems by Raymond W. Warren and Romald E. Bowles and is also a continuation-in-part of the application Serial No. 4,830, now abandoned, filed January 26, 1960 for Multistable Memory Unit by Raymond W. Warren and Romald E. Bowles.

The specific nature of the invention, as well as other objects, uses and advantages thereof, will clearly appear from the following description and from the accompanying drawings, in which.

Figures 1, 2, 3:
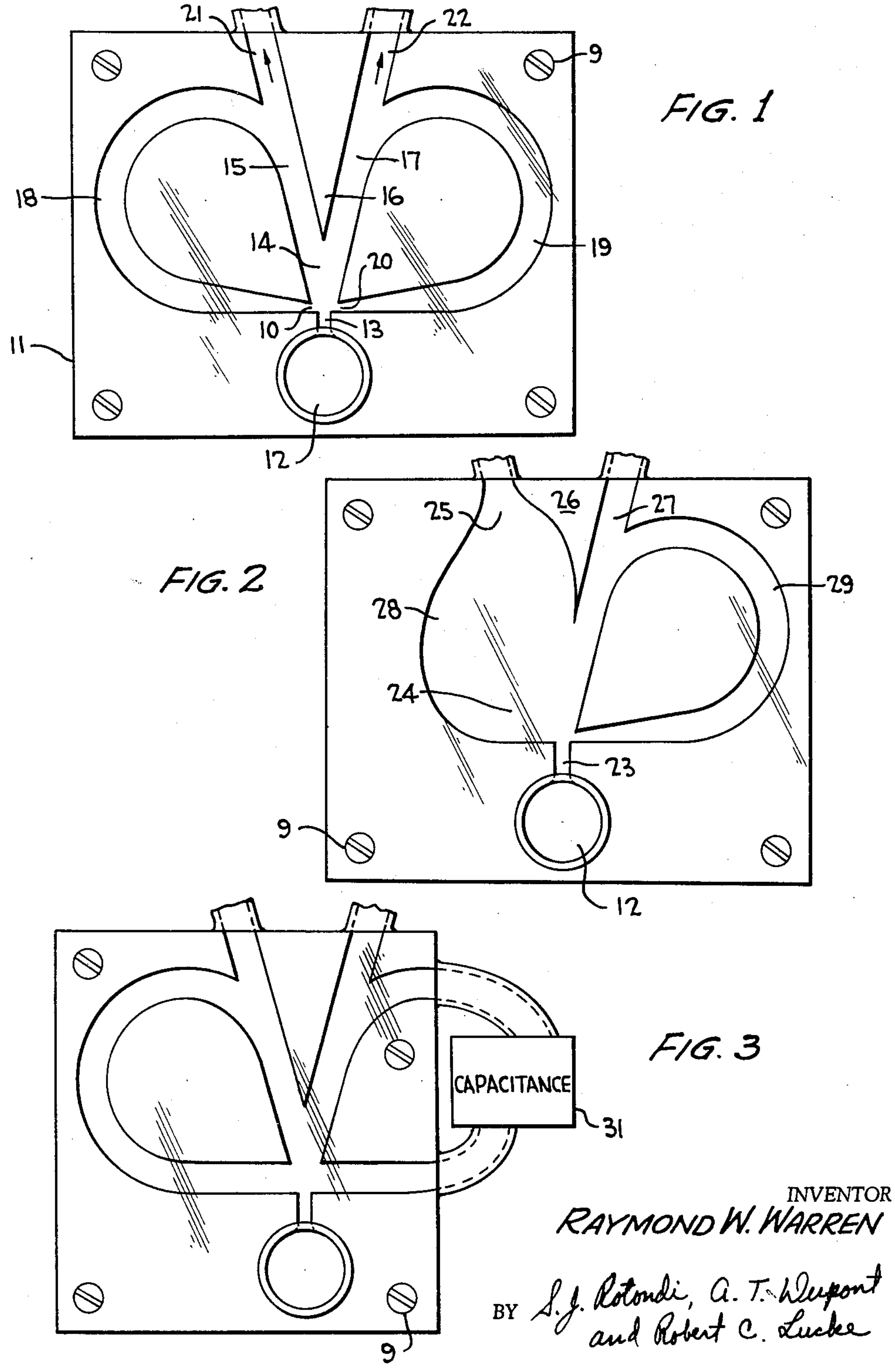
FIGURE 1 is a plan view of a fluid-operated system in accordance with the principles of this invention.
FIGURE 2 is a plan view of another embodiment of the system in FIGURE 1.
FIGURE 3 is a plan view of still another embodiment of the system in FIGURE 1.
Figure 5A:
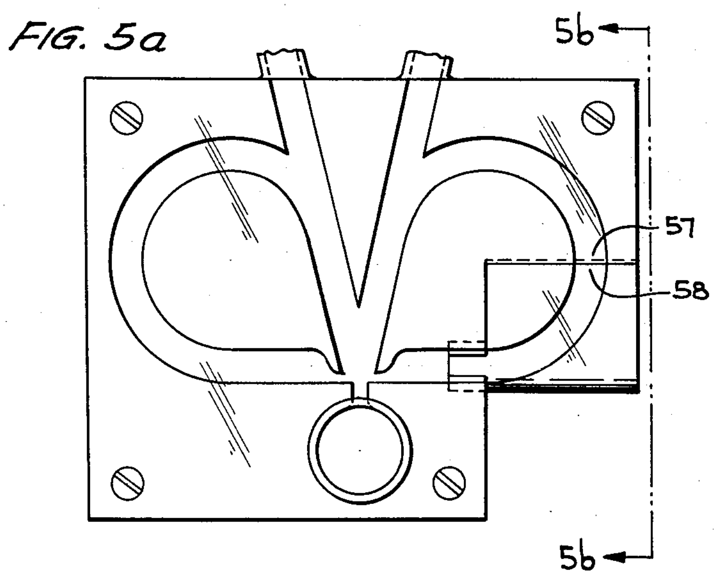

FIGURE 5*a* is a plan view of another embodiment of the system in FIGURE 1.

Figure 5B:
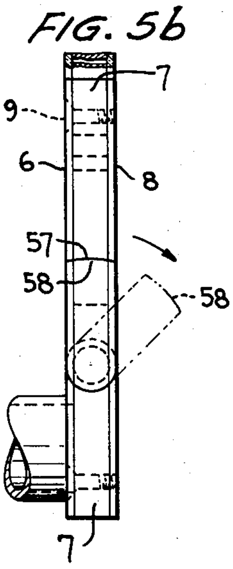

FIGURE 5*b* is an end view of the embodiment as seen in the direction of arrows **5*b*—5*b*** in FIGURE 5*a*.

Figure 6:
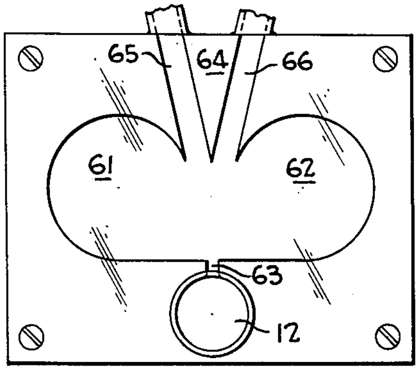

FIGURE 6 is a plan view of another embodiment of the system in FIGURE 1.

FIGURE 1 illustrates one embodiment of the oscillator fluid-operated system of this invention. The fluid-operated system referred to by numeral 11 is formed by three flat plates 6, 7 and 8, respectively, as shown in FIGURE 5*b*. Plate 7 is positioned between plates 6 and 8 and is tightly sealed between these two plates by machine screw 9. Plates 6, 7 and 8 may be composed of any metallic, plastic, ceramic or other suitable material. For purposes of illustration, plates 6, 7 and 8 are shown composed of a clear plastic material. It will be evident that the plates may be sealed together by adhesives or any other suitable means.

A configuration cut from plate 7 provides a fluid power supply entry means 12, a fluid power supply nozzle 13, a chamber 14, a left receiver 15, a divider 16 and a right receiver 17, a left feedback channel 18 and a right feedback channel 19, a left control nozzle 10 and a right control nozzle 20, and a left output channel 21 and a right output channel 22. Control nozzles 10 and 20 are directed oppositely and positioned substantially on the same centerline. Supply nozzle 13 is positioned at substantially right angles to the centerline of the control nozzles. The fluid power supply nozzle 13 and left and right control nozzles 10 and 20 have their openings directed so as to introduce fluids into chamber 14. Also connected to chamber 14 are the two receivers 15 and 17 with divider 16 positioned to separate receivers 15 and 17. Divider 16 is generally wedge shaped with the pointed edge being positioned, in a symmetric system, along the centerline of the control nozzle, and the sides of the wedge that converge to the pointed edge define one side of each of the receivers 15 and 17. One end of the left feedback channel 18 is connected to left receiver 15 at a point far enough away from said power nozzle 13 and the pointed end of divider 16 to assure proper lock-on of the power stream when in receiver 15. The other end of the left feedback channel terminates in left control nozzle 10 so that a portion of the power stream in receiver 15 is fed through feedback channel 18 through left control nozzle 10 to enter chamber 14. Since the embodiment shown in FIGURE 1 is symmetric about the centerline of the power stream, right feedback channel 19 is positioned and connected in the system the same as the left feedback channel 18 is connected to the system. Right feedback channel 19 opens into the right receiver 17 and through the right control nozzle 20 into chamber 14.

The term "orifice," as used herein, includes orifices having parallel, converging, or diverging walls or any conventional shape.

The orifices of nozzles 10 and 20 having identical cross-sectional areas in this embodiment. A pair of divergent walls which define one side of each of the receivers 15 and 17 terminate at nozzles 10 and 20, respectively, with the divider 16, form the chamber 14. The output channels 21 and 22 are sealed to output means in such a manner as not to permit the escape of the power fluid. A fluid power source is connected to a bore 12 through which the fluid power stream is introduced to power nozzle 13. The fluid from the power source can be air or other gas, or water or other liquid. Gas, with or without solid or liquid particles, has been found to work very satisfactorily in system 11. Liquid may have solid particles or gas bubbles estrained therein. A fluid-regulating valve may also be used in conjunction with the power source to insure continuous flow of fluid at a constant pressure. Such fluid-regulating valves are, of course, conventional.

In order to clarify the boundary layer control feature of this invention, consider a unit of the type illustrated FIGURE 1. When fluid under pressure is applied to the power nozzle, there is flow through the power nozzle which results in a power jet. Initially the power jet passes through the interaction region substantially undeflected. As a result of viscous interaction between the power jet fluid and the surrounding fluid, the surrounding fluid is accelerated in the power jet direction as a result of momentum exchange. This entrainment of the fluid surrounding the stream transports the fluid on each side of the power jet out of the region of chamber 14 bordering the power jet. This action lowers the pressure on each side of the power jet and fluid from feedback channels 18 and 19 flows through nozzles 10 and 20 into the interaction chamber 14 to replace the fluid entrained and removed by the power jet.

The power stream flow through interaction region 14 creates turbulence therein and, therefore, differential pressure perturbations will exist transverse to the power jet. Small eddy currents occur on the edges of the stream with a component of force capable of deflecting the stream a small amount. Since these eddies occur at random at places along the stream, the forces of the eddies are asymmetric. The pressure perturbations deflect the power jet slightly to an asymmetric flow configuration. The effect becomes asymmetrical to a degree which increases with increasing effective sidewall length. The effective sidewall length can be established by: physically limiting sidewall length, or by change of slopes of the sidewalls as shown in FIGURE 1 so as to cause the sidewall divergence to increase or decrease as desired or by locating the leading edge of divider 16 with respect to distance from the exit of power nozzle 13 by using the divider as a shield between the power jet and one of the sidewalls downstream from nozzles 10 and 20. Thus, the degree of power stream asymmetry which will develop for a given power stream deflection and control flow combination is reduced by shortening the effective length of the sidewall, or by changing the sidewall divergence angle to a large value or by bringing the divider 16 leading edge closer to the power nozzle 13 exit. The asymmetry of the flow referred to above can exist in the absence of any control flow through feedback channels 18 and 19, and subsequently through nozzles 10 and 20, once the perturbations have deflected the power stream to favor one of the receivers 15 or 17. The power stream approaches the sidewall of the interaction chamber associated with the favored receiver and entrains the fluid therebetween. With the pressure on the favored wall lowered by the entrainment, and with the pressure in the vicinity of the other sidewall exceeding the lowered pressure, the higher pressure from the sidewall associated with the not-favored receiver moves the power stream toward the lowered pressure area and the stream is locked onto the favored wall by the higher pressure on the other side of the power stream. With a majority of the power stream in the favored receiver, the feedback channel associated therewith transmits a fluid wave at the speed of sound to the control nozzle connected thereto. The fluid wave increases the pressure in the region of lock-on and satisfies the entrainment requirements of the flow. Since this pressure increase predominates over the pressure in the region of the other sidewall, and since the entrainment on the opposite side of the power stream has lowered the pressure on the opposite side, the power stream is pushed by the increased pressure toward the other sidewall where it locks-on and a majority of the power stream is in the originally not-favored receiver. A second feedback signal against the side of the power stream opposite the side encountered by the first feedback signal causes the power stream to move back to the first favored receiver. This completes a cycle of operation which continues until the power stream is terminated.

The fluid oscillator of FIGURE 1 can be designed so that the system will oscillate without the power stream ever locking-on to a wall. This is the case in which the feedback channels are properly shortened and the divergence of the angle of the sidewalls is properly enlarged so that the feedback signal is returned to the power stream before the power stream can swing all the way to a sidewall. In this mode of oscillation, the power stream can merely swing a short distance with a majority of the fluid in the favored receiver and a lesser amount in the not-favored receiver. The power stream, for example, can be divided seventy five percent in the favored receiver and twenty five percent in the not-favored receiver.

The power stream divides the interaction chamber 14 into two distinct regions, namely the right and the left boundary regions. The right boundary region is defined by the right sidewall associated with the right receiver 17, the interaction chamber end wall and the power stream. The left boundary region is defined by the left sidewall associated with the left receiver 15, the interaction chamber end wall and the power stream. When the power stream is in the receiver associated with a particular boundary region, the other boundary region includes the receiver not being used by the power stream and makes use of this unused receiver as a source of pressure which is higher than the pressure in the entrained fluid region along the wall associated with the receiver into which the power stream is flowing.

Assume for purposes of discussion that right receiver 17 is favored by the power stream and that deflection is toward the right sidewall of chamber 14 where lock-on occurs. This lock-on reduces the area between the power stream and the sidewall of chamber 14 associated with receiver 17. The right boundary region is being evacuated by the power stream entrainment and, therefore, is a lowered pressure area. The left boundary layer, on the opposite side of the power stream, on the other hand is subjected to fluid pressures higher than the right boundary region with the resultant locking-on of the power stream to the right sidewall. With the majority of the power stream now in the right receiver 17, a fluid pressure wave is sent through channel 19 and nozzle 20 into the right boundary region. Upon the receipt of the fluid pressure wave in the right boundary region, the pressure in the right boundary region rises higher than the pressure in the left boundary region and the power stream is moved to the left sidewall by this greater pressure. Lock-on occurs and the power stream flows through left receiver 15 and left feedback channel 18 carries aonther fluid pressure wave to switch the power stream back to the right receiver 17 to complete the cycle. The fluid pressure waves move with the speed of sound.

The oscillator system shown in FIGURE 1 can be made to oscillate without the power stream locking-on to the sidewalls by making the feedback channels short enough and have their opening near enough to the power stream nozzle and the sidewalls moved back far enough that the fluid pressure wave would be presented to the power stream before it has the opportunity to reach any wall to lock-onto.

Output information is available through the output channels 21 and 22. The system of FIGURE 1 will oscillate freely until the input fluid pressure is reduced below a critical amount needed for oscillation.

FIGURE 2 illustrates a modification of the oscillator fluid-operated system shown in FIGURE 1. In the system of FIGURE 2, the symmetry of FIGURE 1 has been destroyed with the left half of the system being rendered devoid of any wall that the power stream could lock-onto. The chamber 24 is dimensioned so that when the power stream from power nozzle 23 is directed therein, the turbulences and perturbations present will merely cause the power stream to have random sinuous activity resulting in a delay in finding the wall associated with the right receiver 27 to lock-onto. A feedback signal is provided through feedback channel 29 to provide a fluid pressure wave or pulse to raise the pressure and unlock the power stream from the right wall whereupon the power stream moves into chamber 24 until entrainment on the right side of the power stream once more results in the power finding the right sidewall and locking-thereon. This asymmetry in the construction of the fluid oscillator of FIGURE 2 provides an asymmetric output with the half cycle associated with the right receiver being constant and identical for identical conditions, and the half cycle associated with the left receiver being variable with respect to the following corresponding half cycles. However, the frequency is constant for constant pressure.

FIGURE 3 illustrates a third embodiment of the oscillator fluid-operated system as shown in FIGURE 1. FIGURE 3 differs from FIGURE 1 in the provision of a capacitance 31 in the right feedback channel. The feedback channel is shown offset so that the entering fluid will not proceed directly through the capacitance, but will provide capacitive filling and emptying to assure the proper delay desired. A fluid pulse through a directly aligned capacitance entry and exit would bypass the capacitance as though there were reduced capacitance in the line. The output configuration of the embodiment of FIGURE 3 is asymmetric with the half cycle representative of the part of the system in which the capacitance offers control being a function of such capacitance while the other half is fixed by the geometry.

Figure 4:
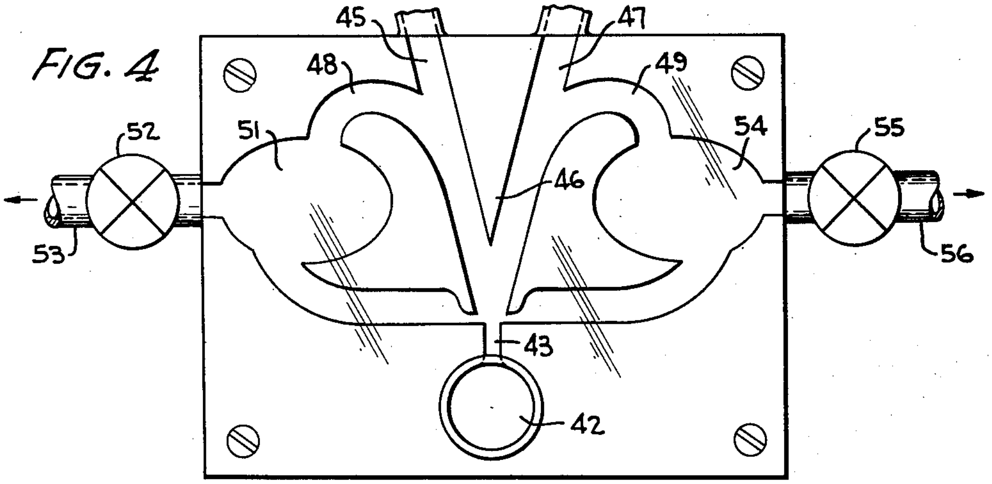
FIGURE 4 is a plan view of a further embodiment of the system in FIGURE 1.

FIGURE 4 shows a further embodiment of the oscillator fluid-operated system of FIGURE 1. The system of FIGURE 4 is symmetric in structural considerations with respect to the centerline of the power nozzle 43 and the power stream issuing therefrom. Receivers 45 and 47 are separated by divider 46, the pointed edge of which is on the centerline of power nozzle 43. Left and right feedback channels 48 and 49, respectively, are connected further from the nozzle 43 than the pointed end of the divider. Left capacitance chamber 51 is connected in left feedback channel 48 with its entry and exit offset so as to preserve the capacitance of chamber 51 and right capacitance chamber 54 is connected in right feedback channel 49 with its entry and exit offset so as to preserve the capacitance of chamber 54. Also connected to left capacitance chamber 51 is an outlet 53 with a valve 52 controlling the amount of fluid to be exhausted from chamber 51 through outlet 53. Connected to right capacitance chamber 54 is outlet 56 with a valve 55 controlling the amount of fluid to be exhausted from chamber 54 through outlet 56. The frequency of oscillation can be controlled by valves 52 and 55 alone or in concert by increasing the effective capacitance by bleeding fluid and, therefore, delaying the pressure rise in the capacitance. The output signal pulses, taken from receivers 45 and 47, can be timed over a wide range of variation.

FIGURES *5a* and *5b* show still another embodiment of the oscillator fluid-operated system of the invention. Included in this embodiment is a fluid switch 58 which is a means for disconnecting the right feedback channel, shown in open condition in dotted line 58 in FIGURE *5b*, whereby the oscillation of the system can be mechanically halted. With the switch 58 in the position as shown in FIGURE *5a* and in solid line in FIG. *5b*, the feedback loop is complete and the system will provide oscillations. FIGURE *5b* is a sectional view as seen along line *5b—5b* in FIGURE *5a*.

For maintaining the lock-on phenomenon, it is necessary that the walls locked-onto be essentially smooth and without any sharp curvatures in the surface thereof.

FIGURE 6 shows another embodiment of the oscillator fluid-operated system of this invention. In this embodiment, there is no structure to define the inner walls of the feedback channels and the side walls of the interaction chamber are remote as compared to the previous embodiments. With a flat plate on top open only at input channel 12 as shown by plate 6 in FIGURE *5b* and a solid flat plate 8 on bottom, the plate 7 as shown in FIGURE 6 is channeled to provide a nozzle 63 through which the power stream through channel 12 enters a large interaction chamber having two halves 61 and 62. Symmetrically aligned on the center line of the power stream from nozzle 63 is the pointed edge of the divider 64 which separates the left and right output channels 65 and 66, respectively. The outer surfaces of the feedback channels of the other embodiments are preserved. The power stream will favor one of the output channels due to slight asymmetries in the construction or the natural turbulence of the stream. Assume that it is output 66 that is favored. The stream will entrain from both regions 61 and 62, but the counterflow will be impeded from the favored output 66 lowering the pressure in region 62. The higher pressure in region 61 forces the stream toward region 62 until a portion thereof flows around this outer surface to form a vortex and performs in much the same way as when the inner surface of the feedback channel is present. The feedback loop lengths are shorter than in the other embodiments. The input openings of the receivers and the divider pointed-end are located substantially the same distance from the power stream nozzle 63.

It is significant to note that the power stream in this invention is confined in a cavity by "land areas" of the system configuration and by a "top" and a "bottom" plate. These two plates limit the power stream to a plane defined by the power stream in all of its operative positions.

The fluid operated oscillators of this invention are temperature sensitive since the velocity of sound changes with temperature changes. Where $C$=Velocity of sound
$K$=The ratio of specific heats at constant volume and constant pressure
$R$=Gas constant and
$T$=Temperature, The relationship is expressed as $C=\sqrt{KRT}$. The velocity of sound in air, for example is $C=49.02\sqrt{T}$.

Since the feedback signal in each of the systems of this invention is delivered in opposition to the direction of movement of the power stream, the oscillators have been termed as being negative feedback oscillators. It is very easy to adjust the frequency over a wide range of frequencies from very low to very high. The maximum frequency at which the oscillators will operate is dependent upon the speed of the feedback fluid wave; that is, the local speed of sound; the distance the wave has to travel; that is, the length of the feedback loop; and the transit time needed for switching the power stream. When the fluid wave moves at the speed of sound in the loop, not in free atmosphere, the frequency of operation is quite high. Frequency changes can be effected by changing the fluid. The frequency of an oscillator using hydrogen, for example, will have approximately five times the frequency of an oscillator using air. Oscillators having a predetermined frequency of operation can be mass produced by molding or machining once the geometry has been established so as to provide the desired frequency with a desired power fluid.

The lowest frequency at which the oscillators will operate is determined by the minimum amount of energy needed to cause the power to switch. A certain amount of feedback flow is required to satisfy the entrainment before the power stream is switched. If the required amount of flow is not present, the oscillator will produce sounds but it will not switch. When the flow of the feedback fluid is equal to the entrainment requirement, the power stream switches to the opposite side. In the embodiments which include capacitances, the flow will build up but it does not switch the power stream until it reaches the level required for switching. For a particular capacitance, this level is fixed and, therefore, the oscillator has a fixed frequency.

In FIGURES 1 and 2, the feedback nozzles, such as 10 and 20 in FIGURE 1, are shown to be tapered toward a desired opening. This tapering provides an unimpeded path for the fluid wave to travel through the feedback loop without being distorted nor reflected as can occur in the feedback nozzle configuration shown in FIGURES 4 and 5*a*. In FIGURE 3, the feedback nozzles are shown as being continuations of the feedback loop with no tapering or other impedance structure.

The tapered feedback nozzles of FIGURE 1 and the "straight-through" feedback nozzles of FIGURE 3 are design considerations which produce a significant velocity in the first figure and a significant pressure in FIGURE 3 in compliance with the well known Bernouilli principle.

Resistance in the system is determined by the viscosity of the fluid used. The cross sectional area of the channels and the length of the channels.

In summary, the switching of the power stream from one receiver to the other, therefore, is a function of the pressure from the fluid power source, the area of the lock-on wall region, the distance from the power nozzle to the feedback inlet located in the receiver, the length of the feedback channel, the amount of power stream feedback sufficient to cause release of lock-on, the angle of divergence of the receivers, distance of the divider from the power nozzle, the type of fluid employed and the temperature of the system.

This disclosure is directed to a negative feedback fluid-operated oscillator which has no moving parts other than the fluid itself and which can be readily mass produced in a variety of embodiments.

The starting of the oscillation when minor asymmetries exist, as is the general actual case, is considerably easier than with perfect symmetry because the asymmetry increases the favoring of the first channel to receive the power stream.

The dividers have been shown as being sharp wedges. Rounded edge wedges will work equally well and have been utilized in these oscillators.

A round pin, when placed in the power stream between the power nozzle and the divider and perpendicular to the centerline of the power stream, accentuates the generation of vortices for greater perturbations with the accompanying increased favoring of a channel.

It will be apparent that the embodiments shown is only exemplary and that various modifications can be made in construction and arrangement within the scope of the invention as defined in the appended claims.

I claim as my invention:

1. In a fluid-operated oscillator:
(*a*) a fluid power source,
(*b*) a fluid power nozzle connected to said power source for providing a fluid stream,
(*c*) divider means,
(*d*) a first and a second receiver means,
(*e*) said first receiver means being an asymmetric chamber, defined by one side of said divider means, said power nozzle, an outlet means and a curved sidewall extending from said power nozzle to said outlet means, said sidewall being remote from said power stream,
(*f*) said second receiver means being defined by a lock-on wall and a first channel having a portion of said lock-on wall as one side thereof and the other side of said divider means as the other side thereof,
(*g*) and a second channel for feeding back a portion of the power stream connected to said second receiver and to said asymmetric chamber at the end of said lock-on wall in the vicinity of said power nozzle.

2. In a fluid-operated oscillator:
(*a*) a fluid power source,
(*b*) a fluid power nozzle connected to said power source,
(*c*) a divider means having a pointed end,
(*d*) a first and a second receiver means separated by said divider means,
(*e*) said pointed end being aligned with the center of said power nozzle,
(*f*) a first and a second feedback chamber, means to cause a portion of a fluid power stream to impinge upon itself deflecting said stream away from the chamber,
(*g*) said first feedback chamber being defined by a continuous wall extending from said first receiver to said power nozzle and,
(*h*) said second feedback chamber being defined by a continuous wall extending from said second receiver to said power nozzle,
(*i*) all of said means being symmetric about the centerline of said power nozzle, and
(*j*) means confining said power stream to the plane of deflection of said power stream.

References Cited by the Examiner

UNITED STATES PATENTS

| | | | |
|---|---|---|---|
| 3,001,539 | 9/61 | Hurvitz | 137—83 |
| 3,016,063 | 1/62 | Hausmann | 137—597 |
| 3,016,066 | 1/62 | Warren | 137—624.14 |
| 3,024,805 | 3/62 | Horton | 137—597 |

FOREIGN PATENTS 1,323,784 3/62 France.

LAVERNE D. GEIGER, *Primary Examiner.*